Sept. 13, 1932.   P. H. HUTCHINGS   1,877,665
BOLT
Filed Feb. 29, 1932
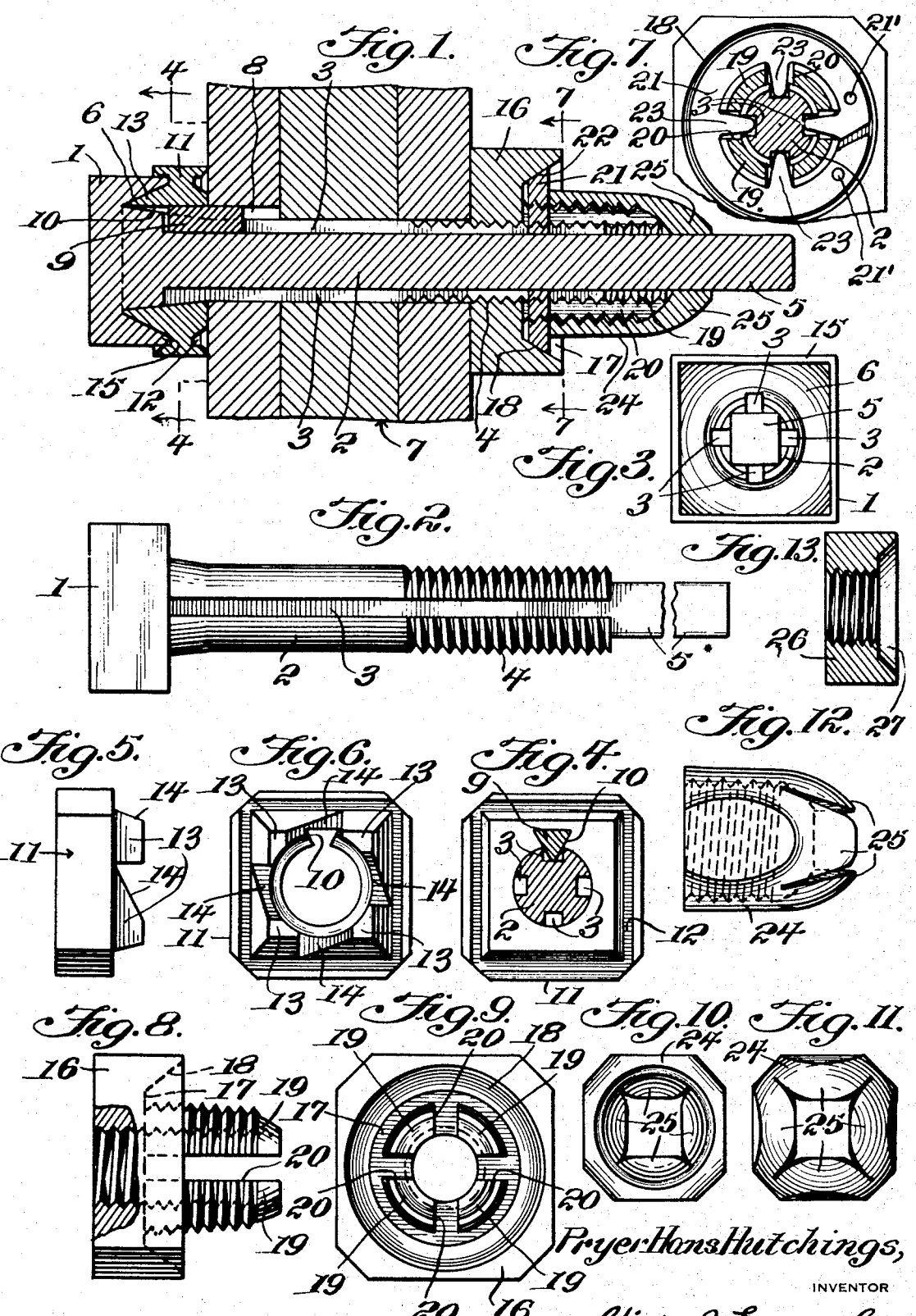
Pryer Hans Hutchings,
INVENTOR
BY Victor J. Evans & Co.
ATTORNEY
WITNESS: J. T. L. Wright Patented Sept. 13, 1932

1,877,665

UNITED STATES PATENT OFFICE

PRYER HANS HUTCHINGS, OF WEWOKA, OKLAHOMA, ASSIGNOR OF ONE-FOURTH TO T. F. HARRISON, OF WEWOKA, OKLAHOMA

BOLT

Application filed February 29, 1932. Serial No. 595,912.

My present invention has reference to a bolt and a nut therefor and my object is the construction of a nut and bolt which when associated after engaging with a structure will be prevented from accidental separation regardless of the vibration to which the structure and the nut and bolt are subjected.

A further object is the provision of a lock bolt and nut that is characterized by simplicity in construction and reliability and efficiency in practical use.

To the attainment of the foregoing the invention consists in the improvement hereinafter described and definitely claimed.

In the drawing:

Figure 1 is a sectional view through the plates of a structure connected in accordance with this invention, the improvement being also in section.

Figure 2 is a plan view of the bolt.

Figure 3 is an end view of the bolt.

Figure 4 is a sectional view approximately on the line 4—4 of Figure 1.

Figure 5 is a side view of the locking element to be associated with the head of the bolt.

Figure 6 is a plan view thereof.

Figure 7 is a sectional view approximately on the line 7—7 of Figure 1.

Figure 8 is a side elevation of the nut.

Figure 9 is a face view thereof.

Figure 10 is a rear elevation of the spring lock or holding means.

Figure 11 is a face view thereof.

Figure 12 is a side elevation thereof.

Figure 13 is a sectional view through a modified form of the nut.

In the showing of the drawing a structure comprising three metal plates are connected in accordance with this invention. The nut and bolt may, of course, be employed for connecting the plates of a wooden structure.

The bolt comprises a head 1 and a shank 2. The shank is widened at its connection with the head 1, and the said shank is provided with right angularly disposed grooves 3 which extend the entire length of the shank. The shank has an outer threaded portion 4 and its end, beyond the said threaded portion is reduced and squared in cross section, as at 5, and the lower walls afforded by the respective grooves 3 are in a plane with the respective outer faces of the cross sectionally squared portion 5. The inner face of the head 1 is formed with a depression 6 whose inner and outer walls are arranged at opposite angles, the inner angle walls being disposed in a line with the widened inner end of the shank of the bolt and the outer inclined walls terminate adjacent to the outer perimeter of the head 1. Thus the inner face of the bolt, at the perimeter thereof, is formed with a reduced and beveled portion which, if desired, may be driven into one of the outer plates of the wooden structure.

The plates comprising the structure 7 are bored to provide an opening for the shank of the bolt and the end plate, adjacent the head of the bolt, is grooved, as at 8, and the said groove is designed to aline with one of the grooves 3 in the shank and receive therein a key member 9 designed to enter a key opening 10 that communicates with the round bore of a locking or holding element 11. The element is slipped over the bolt and is peripherally shaped to correspond with the head 1, but the element is slightly greater in size than is the head 1. The element 11, on one of its faces, is formed, adjacent its perimeter with a continuous groove 12 and on its second face, adjacent its perimeter, with outwardly projecting preferably centrally notched lugs 13, the notches 14 dividing the lugs into right angular members which are arranged adjacent to the corners of the element 11. In the showing of Figure 1 of the drawing the lugs 13 are designed to be received in the depression or groove 6 on the inner face of the head 1 so that the ribs formed at the opposite sides of the grooved portion 12 on the opposite face of the element 11 will be brought into impinging engagement with the plate provided with the groove 8, and thereby hold the bolt from turning. When the bolt engages with a wooden structure the element 11 is reversely positioned so that the reduced outer continuous walls 15 provided on the inner face of the nut will receive therein the continuous groove 12 and the element 11 and hold the lugs 13 in a position to be driven into a wooden plate of the structure 7, it being understood, of course, that the wedge key 9 is employed for holding the element 11 from turning on the bolt.

Screwed on the threaded end of the bolt to contact with the second outer plate of the superstructure 7 there is a nut 16. The outer face of this nut is provided with a round depression 17 whose side or peripheral wall is arranged at an inward angle, as indicated by the numeral 18. In a line with the bore of the nut there is extended outwardly from the depressed portion thereof four right angularly disposed fingers 19, the spaces between the fingers being indicated for distinction by the numeral 20 and the outer surface of the fingers are threaded at a different hand pitch from the interior threads of the nut and from those on the bolt.

Designed to be received in the pocket afforded by the depression 17 in the nut 16 there is a lock washer 21 which is round in plan and has its periphery cut at an angle, as at 22, to frictionally engage with the angle wall 18 provided by the pocket 17 in the nut 16. The lock washer is in the nature of a split spring member and has its inner periphery provided with right angularly disposed inwardly extending lugs 23 to be received in the spaces 20 between the fingers 19 on the nut 16. The ends of the split spring lock washer 21 normally spread away from each other and the outer face of the washer, adjacent to its said ends is formed with openings or depressions 21'. These openings 21' are designed to receive therein the tapered jaws of a pair of small tongs, employed by the operator for compressing the washer and arranging the tapered peripheral wall thereof 18 in the tapered pocket 17 of the nut 16.

Screwed on the threaded fingers 19 there is a spring nut in the nature of a holding member 24. This member is designed to contact with the lock washer. The spring member 24 has its outer end reduced and rounded. This rounded portion is slitted angularly to afford between the slits spring tongues 25, and the inner faces of the tongues are straightened and reduced with respect to the threaded bore of the member 24 and whereby the end inner faces of the spring tongues will move over the squared end 5 of the shank 2 when the holding member 24 is screwed home on the threaded fingers and thereafter frictionally contact with the faces of the said end 5 of the shank for holding the member 24 from accidental unscrewing. To unscrew the member 24 it is necessary to pry the spring tongues 25 away from the bolt which, of course, permits of the separation of the parts constituting the lock nut and bolt. The lock washer 21 is engaged by the prongs to facilitate its removal. By employing a nut 26 such as shown by Figure 13 of the drawing the fingers 19 are dispensed with, the lock 21 having its lugs 23 received in the grooves 3 of the bolt and in which instance the lock washer is of a greater thickness than that disclosed by the drawing so that the same will fill the pocket 27 when the nut 26 is arranged therein and the split spring lock washer is compressed and forced into the pocket by the employment of the short prongs and the said washer is contracted by another and ordinary nut which is screwed on the bolt. In this instance it is not necessary to provide the bolt with the reduced and squared extension 5.

From practice I have found the greater the strain from any direction against the parts constituting the improvement the more effective co-operation of such parts is produced, and that unless the parts are manually separated as above described the accidental separation thereof is practically impossible.

While I have illustrated and described satisfactory embodiments of my improved device my invention is capable of extended application and I do not wish to be restricted to the specific structure herein shown and described.

Having described the invention, I claim:

1. A bolt having its shank grooved longitudinally, a nut engaging the bolt and having its outer face recessed, a split spring washer to be received in the recess and having inwardly extending lugs to be received in the grooves of the bolt and a holding element engaging the bolt and contacting with the washer, and the inner face of the head of the bolt being recessed to afford substantially sharp edges.

2. A bolt having its shank grooved longitudinally, a nut engaging the bolt and having its outer face recessed, a split spring washer to be received in the recess and having inwardly extending lugs to be received in the grooves of the bolt and a holding element engaging the bolt and contacting with the washer, the inner face of the head of the bolt being recessed to afford substantially sharp edges and an impinging element having its opposite faces provided with continuous grooves and sharpened edges to be reversibly received in the recess of the head and a key in one of the grooves of the bolt engaging said impinging element.

3. A bolt having its shank grooved longitudinally, a nut engaging the bolt and having its outer face recessed, a split spring normally expanded washer to be received in the recess and having inwardly extending lugs to be received in the grooves of the bolt and a holding element engaging the bolt and contacting with the washer, the inner face of the head of the bolt being recessed to afford substantially sharp edges, and an impinging element having its opposite faces provided with continuous grooves and sharpened edges and one of the faces of the said impinging element formed with lug extensions in a line with the inner wall of the recess, said member designed to have its inner portion reversibly received in the recess of the head and a key in one of the grooves of the bolt engaging said impinging element for holding the same on the head.

4. A bolt having its shank grooved longitudinally, a nut screwed on the bolt and having its outer face recessed to provide a pocket, and having spaced outwardly projecting fingers provided with threads arranged at a different hand pitch from the threads of the bolt, a split spring normally expanded washer received in the recess of the nut and having inwardly extending lugs to be received between the fingers and in the grooves of the bolt and a holding member screwed on the fingers and contacting the washer in the pocket, and spring fingers on the outer end of the holder member exerting a pressure toward each other and engaging with the bolt.

5. A bolt having its shank grooved longitudinally and having a cross sectionally squared portion at its outer end, a nut screwed on the bolt having inner projecting spaced fingers and provided with outer threads which are arranged at a different hand pitch from the threads of the bolt, said nut having its outer face provided with a tapered recess surrounding the fingers, a normally expanded split spring lock washer having a tapered periphery to be received in the recess and having inwardly projecting lugs to be received between the fingers and in the grooves of the bolt, a spring nut comprising a holder member which is screwed on the fingers to contact with the washer and said holding nut having spring tongues on its outer face whose inner walls are straight for frictional engagement with the non-threaded end of the bolt.

6. A bolt having its shank grooved longitudinally and having a cross sectionally squared portion at its outer end, a nut screwed on the bolt having inner projecting spaced fingers, provided with outer threads which are arranged at a different hand pitch from the threads of the bolt, said nut having its outer face provided with a tapered recess, a normally expanded peripherally tapered split spring lock washer to be received in the recess and having inwardly projecting lugs to be received between the fingers and in the grooves of the bolt, a spring nut comprising a holder member which is screwed on the fingers to contact with the washer, and said holding nut having spring tongues on its outer face whose inner walls are straight for frictional engagement with the non-threaded end of the bolt, a reversible impinging means removably fixed on the head of the bolt for engaging an object to be contacted by the head of the bolt.

In testimony whereof I affix my signature.

PRYER HANS HUTCHINGS.